(12) United States Patent
Shingai

(10) Patent No.: US 8,251,363 B2
(45) Date of Patent: Aug. 28, 2012

(54) IMAGE READER

(75) Inventor: Hiroyuki Shingai, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/051,170

(22) Filed: Mar. 18, 2011

(65) Prior Publication Data

US 2011/0233849 A1 Sep. 29, 2011

(30) Foreign Application Priority Data

Mar. 25, 2010 (JP) ................................. 2010-070045

(51) Int. Cl.
*B65H 5/00* (2006.01)

(52) U.S. Cl. ....................... 271/10.11; 271/270; 399/367

(58) Field of Classification Search .................. 399/374, 399/367; 358/408, 493, 496, 498; 271/3.14, 271/264, 116, 270

See application file for complete search history.

(56) References Cited

U.S. PATENT DOCUMENTS

| | | | | |
|---|---|---|---|---|
| 4,536,077 A * | 8/1985 | Stoffel | ........................... | 358/497 |
| 5,760,919 A * | 6/1998 | Acquaviva et al. | ............ | 358/450 |
| 6,076,822 A  | 6/2000 | Baba et al. | ................. | 271/10.09 |
| 6,206,359 B1 * | 3/2001 | Hirota et al. | .................. | 271/3.15 |
| 6,678,076 B1 * | 1/2004 | Hasegawa et al. | ............ | 358/496 |
| 6,721,074 B1 * | 4/2004 | Kao | ............... | 358/496 |
| 7,338,042 B2 * | 3/2008 | Shimizu | ........................ | 271/110 |
| 7,414,762 B2 * | 8/2008 | Poletto | ........................... | 358/496 |
| 7,612,925 B2 * | 11/2009 | Tseng | ............................ | 358/496 |
| RE42,269 E * | 4/2011 | Kao | ............... | 358/496 |
| 8,014,042 B2 * | 9/2011 | Magata | ......................... | 358/474 |
| 2009/0067009 A1 * | 3/2009 | Yoshizawa | .................... | 358/461 |
| 2009/0086286 A1 | 4/2009 | Tojo | | |
| 2009/0284808 A1 | 11/2009 | Hamada et al. | | |

FOREIGN PATENT DOCUMENTS

| | | |
|---|---|---|
| JP | 9046472 A | 2/1997 |
| JP | 2000128387 A | 5/2000 |
| JP | 2002271574 A | 9/2002 |
| JP | 2003289420 A | 10/2003 |
| JP | 2003-324579 | 11/2003 |

(Continued)

OTHER PUBLICATIONS

Notification of Reasons for Rejection for Japanese patent application No. 2010-070045 mailed Jan. 31, 2012.

*Primary Examiner* — Jeremy R Severson
(74) *Attorney, Agent, or Firm* — Banner & Witcoff, Ltd.

(57) ABSTRACT

An image reader is provided, which includes an intermediate feed roller that is disposed downstream relative to a separation roller on a feeding path and configured to rotate in contact with a document sheet separated and fed by the separation roller and feed the document sheet to a downstream side on the feeding path so as to restrain a variation of a tensile force applied to the document sheet, which variation may be caused when the document sheet is fed and away from the separation roller, and only a single U-turn roller that is disposed downstream relative to the intermediate feed roller on the feeding path, and configured to rotate in contact with the document sheet fed by the intermediate feed roller and feed the document sheet to a reading unit in a U-turn manner on a U-turn path curved along an outer circumferential surface of the U-turn roller.

4 Claims, 3 Drawing Sheets

FOREIGN PATENT DOCUMENTS

| | | |
|---|---|---|
| JP | 2006081096 A | 3/2006 |
| JP | 2006-333003 | 12/2006 |
| JP | 2008187595 A | 8/2008 |
| JP | 2009088692 A | 4/2009 |
| JP | 2009278383 A | 11/2009 |
| JP | 2009296045 A | 12/2009 |
| JP | 2010042894 A | 2/2010 |

* cited by examiner

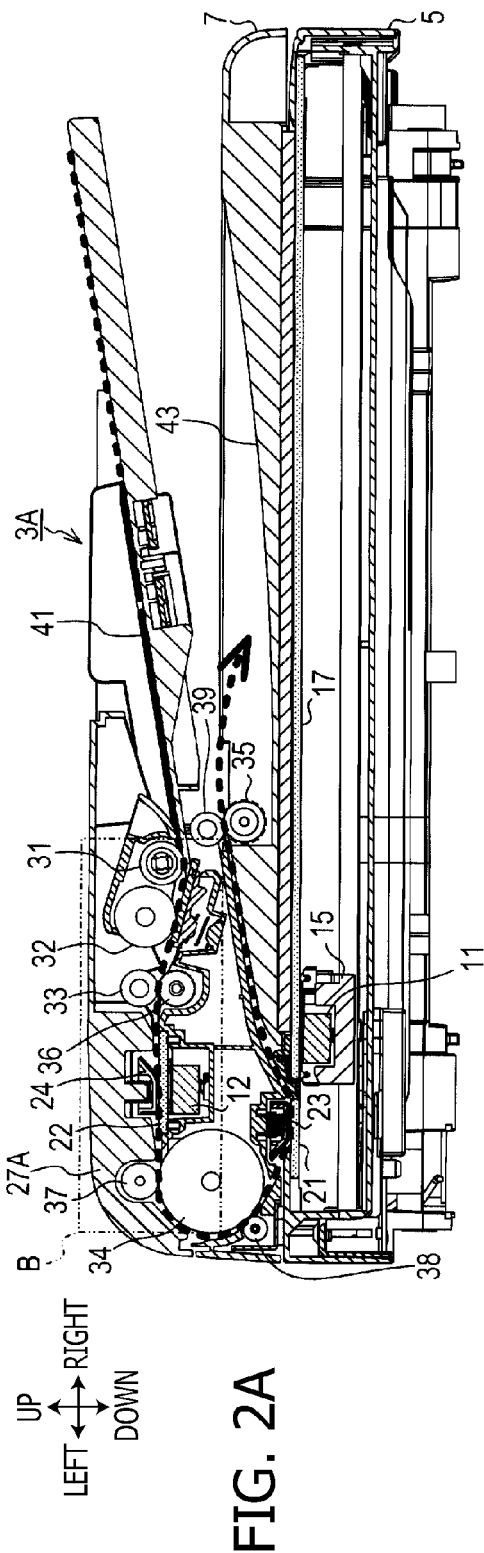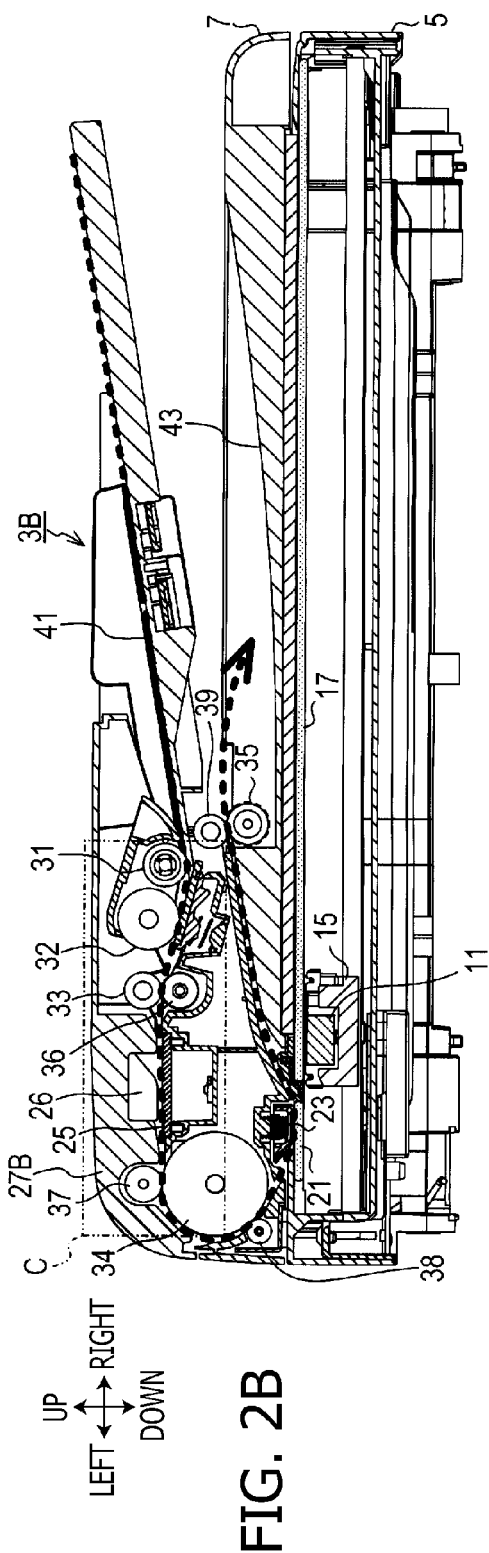

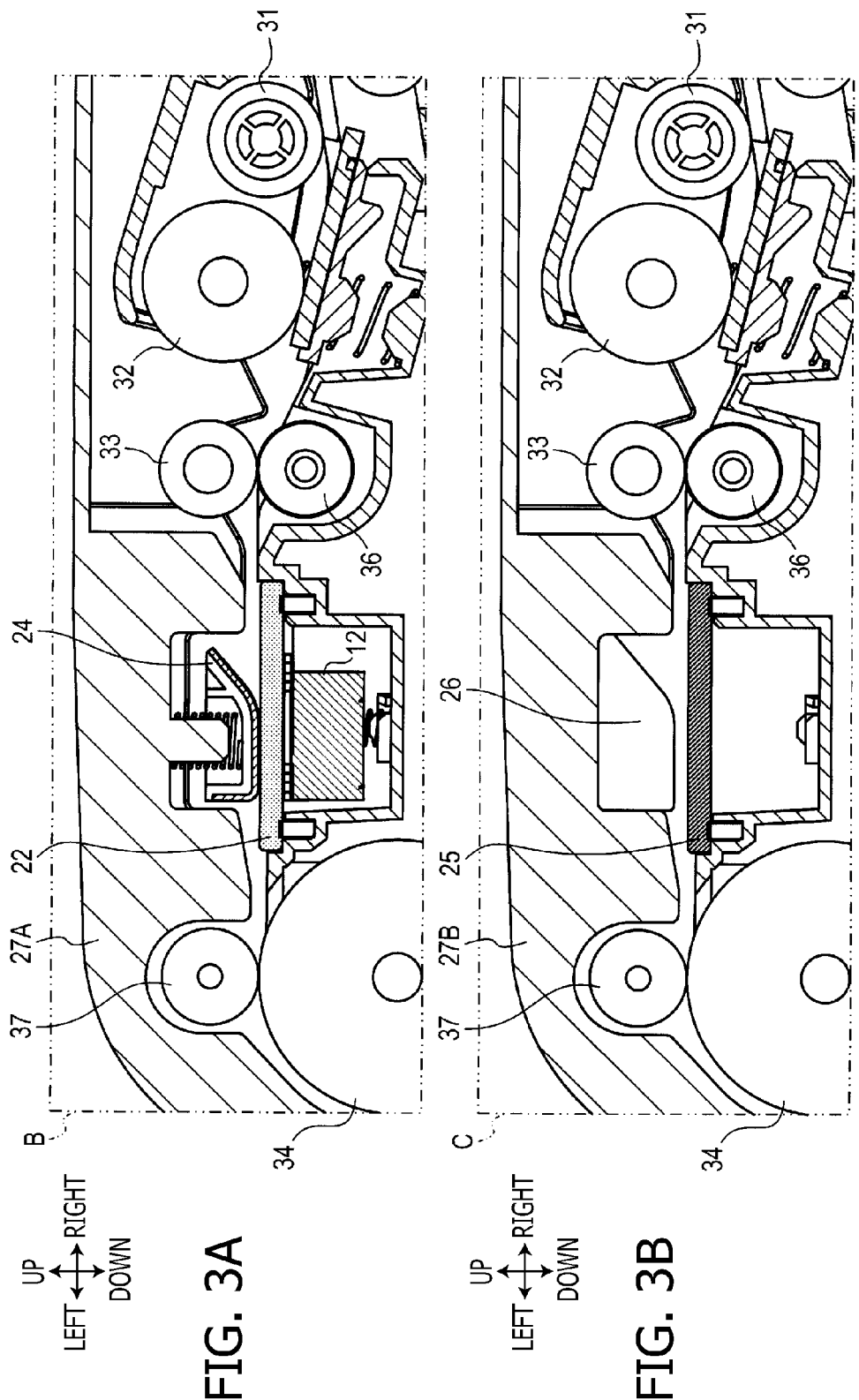

IMAGE READER

CROSS-REFERENCE TO RELATED APPLICATION

This application claims priority under 35 U.S.C. §119 from Japanese Patent Application No. 2010-070045 filed on Mar. 25, 2010. The entire subject matter of the application is incorporated herein by reference.

BACKGROUND

1. Technical Field

The following description relates to one or more image readers.

2. Related Art

So far, an image reader has been known, which is configured to read out images from both sides of a document sheet. The known image reader reads out an image from a first side of the document sheet when the document sheet passes through a reading position for the first time, and reads out an image from a second side of the document sheet when the document is conveyed in a switchback manner and again passes through the reading position.

SUMMARY

In the known image reader, feed rollers are disposed in a plurality of respective positions along a feeding path for making the document sheet U-turn (hereinafter, referred to as a U-turn path). In this configuration, the document sheet comes into contact with the feed rollers in the plurality of positions.

Therefore, when the feed rollers disposed along the curved U-turn path are driven to rotate, the document sheet might have wrinkles/folds formed thereon and/or jam, owing to differences among feeding velocities of the feed rollers.

Especially, in double-side reading, as the document sheet conveyed in the switchback manner passes through the U-turn path twice, there are problems such as that the double-side reading takes a long time and that the wrinkles/folds and the paper jam might be more likely to be caused.

Aspects of the present invention are advantageous to provide one or more improved techniques for an image reader, which techniques make it possible to prevent wrinkles/folds and a paper jam even in document feeding along a U-turn path.

According to aspects of the present invention, an image reader is provided, which includes a separation roller configured to rotate in contact with a document sheet and separate and feed the document sheet on a sheet-by-sheet basis to a downstream side on a feeding path, an intermediate feed roller disposed downstream relative to the separation roller on the feeding path, the intermediate feed roller being configured to rotate in contact with the document sheet separated and fed by the separation roller and feed the document sheet to a downstream side on the feeding path so as to restrain a variation of a tensile force applied to the document sheet, which variation of the tensile force may be caused when the document sheet is fed and away from the separation roller, only a single U-turn roller that is disposed downstream relative to the intermediate feed roller on the feeding path, and configured to rotate in contact with the document sheet fed by the intermediate feed roller and feed the document sheet in a U-turn manner on a U-turn path of the feeding path that is curved along an outer circumferential surface of the U-turn roller, and a first reading unit that is disposed downstream relative to the U-turn roller on the feeding path, and configured to read out an image from the document sheet fed by the U-turn roller.

BRIEF DESCRIPTION OF THE ACCOMPANYING DRAWINGS

FIG. 2A is a cross-sectional side view of the MFP having two image sensors along an A-A line shown in FIG. 1A in the embodiment according to one or more aspects of the present invention.

FIG. 2B is a cross-sectional side view of the MFP having a single image sensor along the A-A line shown in FIG. 1A in the embodiment according to one or more aspects of the present invention.

FIG. 3A is an enlarged view of a part B shown in FIG. 2A in the embodiment according to one or more aspects of the present invention.

FIG. 3B is an enlarged view of a part C shown in FIG. 2B in the embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect.

Hereinafter, an embodiment according to aspects of the present invention will be described with reference to the accompanying drawings.

[Configuration of MFP]

Figure 1A:
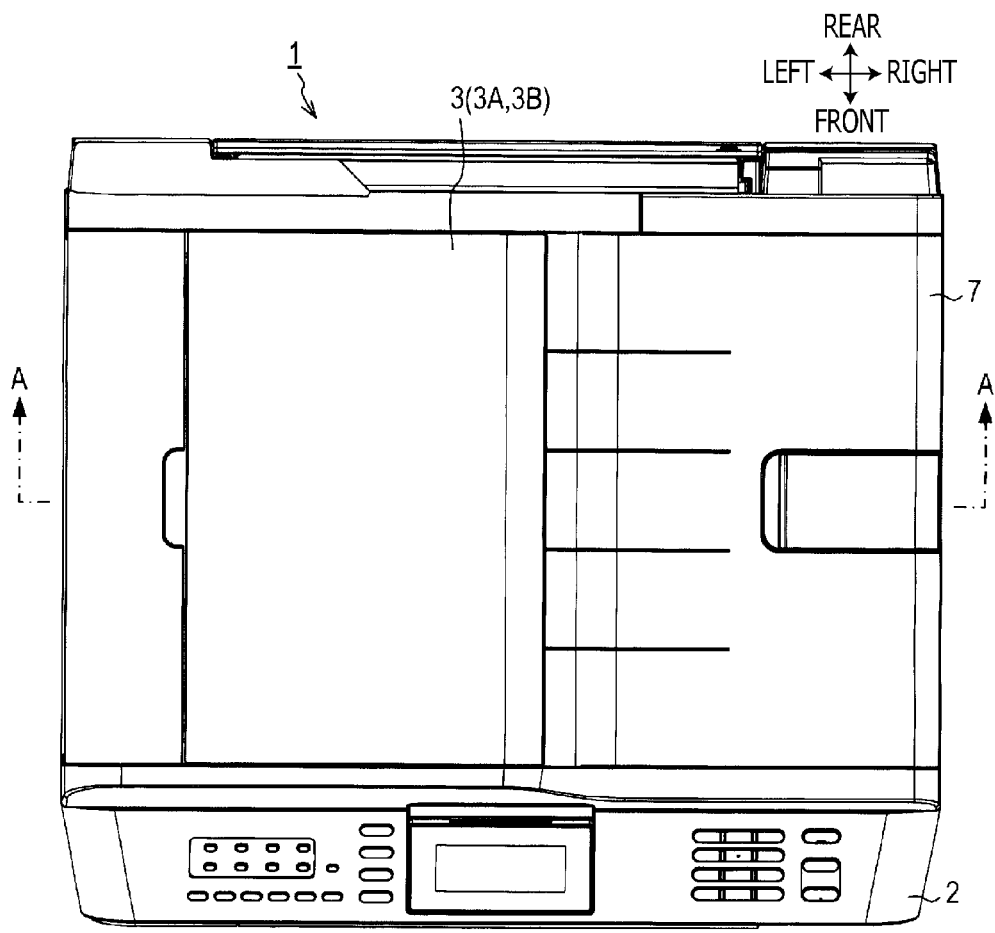
FIG. 1A is a top view of a multi-function peripheral (MFP) having an image reading function in an embodiment according to one or more aspects of the present invention.
Figure 1B:
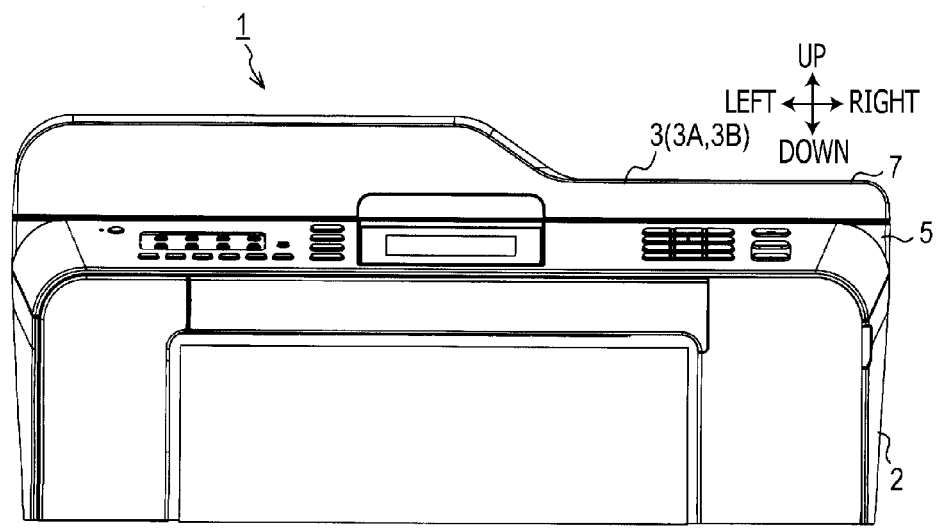
FIG. 1B is a front view of the MFP having an image reading function in the embodiment according to one or more aspects of the present invention.

A multi-function peripheral (MFP) 1 shown in FIGS. 1A and 1B has multiple functions such as a scanning function, a printing function, a copy function, and a facsimile function. In the following description, an up-to-down direction (i.e., the vertical direction), a left-to-right direction, and a front-to-rear direction will be defined as depicted in the accompanying drawings for the sake of easy understanding of a relative positional relationship among elements included in the MFP 1.

The MFP 1 includes a main unit 2 and a scanning unit 3 disposed above the main unit 2. The scanning unit 3 is configured to, when a front end thereof is turned up and down around a rear end thereof, be opened and closed relative to the main unit 2. When the scanning unit 3 is moved from a closed state (see FIGS. 1A and 1B) to an open state (not shown) using the aforementioned open-closed mechanism, a user can implement maintenance of an internal mechanism incorporated inside the main unit 2.

The scanning unit 3 includes a document loading unit 5 configured such that a document sheet is placed thereon and a cover 7 configured to cover an upper side of the document loading unit 5. The cover 7 is configured to, when a front end thereof is turned up and down around a rear end thereof, be opened and closed relative to the document loading unit 5. When the cover 7 is moved from a closed state (see FIGS. 1A and 1B) to an open state (not shown) using the aforementioned open-closed mechanism, the user can place a document sheet on the document loading unit 5.

Further, the cover 7 is configured to be displaced relative to the document loading unit 5 in the vertical direction. This displacement mechanism is provided to the cover 7, separately from the aforementioned open-closed mechanism. Thereby, even though a relatively thick document sheet is to be placed on the document loading unit 5, the document sheet can be set on the document loading unit 5 in a state sandwiched between the document loading unit 5 and the document cover 7.

[Detailed Configuration of Scanning Unit]

A detailed explanation will be provided about the scanning unit 3 with reference to FIGS. 2 and 3. In the embodiment, the scanning unit 3 may be one of two types, i.e., a double-side reading unit and a single-side reading unit. A part of the scanning unit 3 is configured in a different manner depending on whether the scanning unit 3 is the double-side reading unit or the single-side reading unit. In the following description, the double-side reading unit and the single-side reading unit will be referred to as a scanning unit 3A and a scanning unit 3B, respectively.

The scanning unit 3A of the double-side reading type is shown in FIGS. 2A and 3A. The scanning unit 3B of the single-side reading type is shown in FIGS. 2B and 3B.

Each of the scanning units 3A and 3B is configured with an automatic document feeder (ADF) adding to a flatbed (FB) scanner.

Each of the scanning units 3A and 3B includes a first image sensor 11. In addition, the scanning unit 3A includes a second image sensor 12. In the embodiment, a contact image sensor is employed for each of the first image sensor 11 and the second image sensor 12.

In each of the scanning units 3A and 3B, the first image sensor 11 is mounted on a carriage 15 provided to the document loading unit 5 and configured to move together with the carriage 15 in the left-to-right direction in a reciprocating manner. Further, there is an FB glass 17 provided above the moving path of the first image sensor 11.

When the scanning unit 3A or 3B is used as an FB scanner, the document sheet is placed on the FB glass 17. In this case, the first image sensor 11 reads an image on the document sheet by repeatedly capturing image data of a plurality of pixels aligned along a main scanning direction while moving in an auxiliary scanning direction. It is noted that the main scanning direction is defined as the front-to-rear direction of the MFP 1, and the auxiliary scanning direction is defined as the left-to-right direction of the MFP 1.

Additionally, in the scanning unit 3A, a first ADF glass 21 is disposed in a position that is above the moving path of the first image sensor 11 and on a left side relative to the FB glass 17. A second ADF glass 22 is disposed above the second image sensor 12. Further, in the scanning unit 3A, a first pressing member 23 is disposed above the first ADF glass 21, and a second pressing member 24 is disposed above the second ADF glass 22.

Meanwhile, in the scanning unit 3B as well, the first ADF glass 21 is disposed in a position that is above the moving path of the first image sensor 11 and on a left side relative to the FB glass 17. Further, the first pressing member 23 is disposed above the first ADF glass 21.

However, the scanning unit 3B is not provided with the second image sensor 12. Hence, in the scanning unit 3B, a lower guide member 25, which is formed in the same shape as the second ADF glass 22, is disposed in the same position as the second ADF glass 22 is disposed in the scanning unit 3A.

Further, in the scanning unit 3B, an upper guide member 26 is disposed in such a position that the second pressing member 24 is disposed in the scanning unit 3A. The upper guide member 26 includes a plurality of comb-like ribs arranged in the front-to-rear direction at intervals of a predetermined distance. The upper guide member 26 is formed integrally with an ADF cover 27B. Namely, differently-shaped cover bodies are employed for an ADF cover 27A of the scanning unit 3A and the ADF cover 27B of the scanning unit 3B, respectively.

Further, each of the scanning units 3A and 3B includes a group of rollers that constitute the ADF. Specifically, each of the scanning units 3A and 3B includes a pickup roller 31, a separation roller 32, an intermediate feed roller 33, a main feed roller 34, and an ejection roller 35, which are driven by driving forces transmitted by a power source.

Additionally, each of the scanning units 3A and 3B includes a first nip roller 36, a second nip roller 37, a third nip roller 38, and a fourth nip roller 39, which nip the document sheet in cooperation with the rollers 31 to 35 while rotating following the movements of the rollers being driven or the document sheet being conveyed.

When the scanning unit 3A or 3B is used as an ADF scanner, the group of rollers is driven. At that time, the document sheet placed on a document table 41 is conveyed along a feeding path indicated by a dashed line in FIG. 2A or 2B. Specifically, one or more document sheets placed on the document table 41 are fed by the pickup roller 31 to a downstream side in a feeding direction and separated by the separation roller 32 to be conveyed on a sheet-by-sheet basis.

Further, the document sheet separated by the separation roller 32 is conveyed to the main feed roller 34 by the intermediate feed roller 33. Then, the document sheet is made U-turn on a U-turn path that is curved substantially in a U-shape along an outer circumferential surface of the main feed roller 34. Thereafter, the document sheet fed by the main feed roller 34 is further conveyed by the ejection roller 35 to a downstream side in the feeding direction, and ejected onto a catch tray 43.

It is noted that a feeding velocity V1 for feeding the document sheet by the separation roller 32, a feeding velocity V2 for feeding the document sheet by the intermediate feed roller 33, and a feeding velocity V3 for feeding the document sheet by the main feed roller 34 are set to establish the following relationships among them, i.e., "V1<V2," and "V1<V3." Thereby, the feeding velocity V1 for feeding the document sheet by the separation roller 32 is lower than any of the other feeding velocities V2 and V3. Thus, it is possible to apply to the document sheet a tensile force to strain the document sheet downstream relative to the separation roller 32 on the feeding path and prevent slack of the document sheet.

When the scanning unit 3A or 3B is used as an ADF scanner, the first image sensor 11 moves to a position beneath the first pressing member 23 in the left-to-right direction and stops in the position. It is noted that the second image sensor 12 of the scanning unit 3A is disposed in a position beneath the second pressing member 24 in the left-to-right direction and fixed in the position.

In the scanning unit 3A, the document sheet, conveyed by the group of rollers, is fed by the intermediate roller 33, and thereafter passes through between the second ADF glass 22 and the second pressing member 24 before reaching the main feed roller 34.

At that time, when the front-to-rear direction of the MFP 1 is defined as the main scanning direction and the feeding direction is defined as the auxiliary scanning direction, the second image sensor 12 reads out an image from a second side (a down-facing side at the time when the document sheet passes over the second image sensor 12) of the document sheet, by repeatedly capturing image data of a plurality of pixels aligned in the main scanning direction from the document sheet that is moving in the auxiliary scanning direction.

Further, in each of the scanning units 3A and 3B, the document sheet, conveyed by the group of rollers, is fed by the main feed roller 34, and thereafter passes through between the first ADF glass 21 and the first pressing member 23 before reaching the ejection roller 35.

At that time, with the front-to-rear direction of the MFP 1 as the main scanning direction and the feeding direction as the auxiliary scanning direction, the first image sensor 11 reads out an image from a first side (a down-facing side at the time when the document sheet passes over the first image sensor 11) of the document sheet, by repeatedly capturing image data of a plurality of pixels aligned in the main scanning direction from the document sheet that is moving in the auxiliary scanning direction.

[Effects]

According to the scanning units 3A and 3B configured as above, the document sheet is made U-turn by the single main feed roller 34. Therefore, in making the document sheet U-turn, it is possible to prevent wrinkles/folds of the document sheet and a paper jam, which might be caused due to differences among feeding velocities of a plurality of feed rollers when such a plurality of feed rollers are disposed along the U-turn path and driven to feed the document sheet on the U-turn path.

In addition, the separation roller 32 is configured to separate the document sheet from other sheets using a frictional force. Hence, in general, at a downstream side relative to the separation roller 32 in the feeding direction, the document sheet is likely to have a tensile force applied thereto. Therefore, when the document sheet is fed by the separation roller 32 and away from the separation roller 32, the tensile force applied to the document sheet is likely to drop rapidly, and the feeding velocity is likely to be unstable at a downstream side relative to the separation roller 32 in the feeding direction.

However, in each of the scanning units 3A and 3B, the intermediate feed roller 33 is provided between the separation roller 32 and the main feed roller 34. Therefore, even though the tensile force applied to the document sheet drops rapidly at a downstream side relative to the separation roller 32 in the feeding direction when the document sheet is fed to be away from the separation roller 34, such an rapid drop of the tensile force is caused mainly at an upstream side relative to the intermediate feed roller 33 in the feeding direction.

Accordingly, at a downstream side relative to the intermediate feed roller 33 in the feeding direction, a variation of the tensile force is restrained and it leads to a stable feeding velocity. Thus, it is possible to reduce a negative influence exerted on document reading quality.

Further, in each of the scanning units 3A and 3B, the separation roller 32 and the main feed roller 34 are placed with a predetermined distance therebetween. Thereby, there is a space secured to accommodate the second image sensor 12 between the separation roller 32 and the main feed roller 34.

Therefore, each of the scanning units 3A and 3B may be provided with the second image sensor 12 disposed in the space, so as to perform double-side reading for the document sheet, as actually the scanning unit 3A is. Further, each of the scanning units 3A and 3B may be configured without the second image sensor 12, so as to perform single-side reading, as actually the scanning unit 3B is.

Accordingly, a lot of parts can be shared between the scanning units 3A and 3B. Especially, since the group of rollers that constitute the ADF can totally be shared between the scanning units 3A and 3B, reduction of manufacturing cost resulting from volume efficiency can be expected.

The intermediate feed roller 33 is disposed to be closer to the separation roller 32 than the aforementioned space to accommodate the second image sensor 12. Thus, when the second image sensor 12 is disposed in the space as actually it is in the scanning unit 3A, the second image sensor 12 can perform image reading in an area where the variation of the tensile force applied to the document sheet is restrained. Therefore, it is possible to reduce the negative influence exerted on the document reading quality.

Further, the scanning unit 3A can in parallel perform first-side document reading using the first image sensor 11 and second-side document reading using the second image sensor 12. Therefore, the scanning unit 3A can perform double-side reading more quickly than a known scanning unit configured to read out an image from the first side of the document sheet, then feed the document sheet in a switchback manner, and thereafter read out an image from the second side of the document sheet. Further, the scanning unit 3A needs not make a single document sheet pass through the U-turn path twice for double-side reading. Thus, it is possible to prevent wrinkles/folds of the document sheet and a paper jam.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications may be feasible.

[Modifications]

In the aforementioned embodiment, each of the scanning unit 3A and 3B is configured with the ADF added to the FB scanner. However, the scanning unit 3A and 3B may be configured only for ADF scanning.

Further, in the aforementioned embodiment, each of the scanning unit 3A and 3B includes the space to accommodate the second image sensor 12. However, even though such a space is not provided, when the intermediate feed roller 33 is provided, it is possible to restrain the variation of the tensile force that might exert a negative influence on the main feed roller 34 making the document sheet U-turn.

In the aforementioned embodiment, the upper guide member 26 is formed integrally with the ADF cover 27B. However, the upper guide member 26 may be formed as a part separate from the ADF cover 27B and attached to the ADF cover 27B. In this case, it is possible to share the ADF cover 27A as a common part between the scanning units 3A and 3B.

In the aforementioned embodiment, the scanning units 3A and 3B are configured to be incorporated into the MFP 1. However, the scanning units 3A and 3B may be configured as a single-function image scanner.

What is claimed is:

1. An image reader comprising:
a separation roller configured to rotate in contact with a document sheet and to separate and feed the document sheet on a sheet-by-sheet basis to a downstream side on a feeding path;
an intermediate feed roller disposed downstream relative to the separation roller on the feeding path, the intermediate feed roller being configured to rotate in contact with the document sheet separated and fed by the separation roller and to feed the document sheet to a downstream side on the feeding path so as to restrain a variation of a tensile force applied to the document sheet;
only a single U-turn roller that is disposed downstream relative to the intermediate feed roller on the feeding path, and configured to rotate in contact with the document sheet fed by the intermediate feed roller and feed the document sheet;
a U-turn path provided as a part of the feed path, the U-turn path being curved substantially in a U-shape around an outer circumferential surface of the single U-turn roller, wherein the single U-turn roller is configured to feed the document sheet in a U-turn manner around the outer circumferential surface of the single U-turn roller;
a first reading unit that is disposed downstream relative to the U-turn roller on the feeding path, and configured to read an image from the document sheet fed by the U-turn roller; and
a power source configured to drive the separation roller at a first velocity to feed the document sheet, the intermediate feed roller at a second velocity to feed the document sheet, and the U-turn roller at a third velocity to feed the document sheet, wherein the first velocity is less than the second velocity and the third velocity.

2. The image reader according to claim 1, further comprising a space secured between the separation roller and the U-turn roller, the space accommodating a second reading unit for reading an image from a side of the document sheet opposite to a side read by the first reading unit.

3. The image reader according to claim 2, further comprising the second reading unit disposed in the space.

4. The image reader according to claim 2, further comprising a guide member that is disposed to cover the space and configured to guide the docuMent sheet fed by the intermediate feed roller to the U-turn roller.

* * * * *

UNITED STATES PATENT AND TRADEMARK OFFICE
CERTIFICATE OF CORRECTION

PATENT NO. : 8,251,363 B2
APPLICATION NO. : 13/051170
DATED : August 28, 2012
INVENTOR(S) : Hiroyuki Shingai It is certified that error appears in the above-identified patent and that said Letters Patent is hereby corrected as shown below:

Column 8, Claim 4, Line 20:
Please delete "docuMent" and replace with --document--

Signed and Sealed this
Second Day of April, 2013

Teresa Stanek Rea
*Acting Director of the United States Patent and Trademark Office*